(12) United States Patent
Drozd

(10) Patent No.: US 10,876,684 B1
(45) Date of Patent: Dec. 29, 2020

(54) PORTABLE AND FOLDABLE SHELF AND WINDOW DRESSING SUPPORT DEVICE

(71) Applicant: Ronald Drozd, Fort Lauderdale, FL (US)

(72) Inventor: Ronald Drozd, Fort Lauderdale, FL (US)

( * ) Notice: Subject to any disclaimer, the term of this patent is extended or adjusted under 35 U.S.C. 154(b) by 0 days.

(21) Appl. No.: 16/780,828

(22) Filed: Feb. 3, 2020

Related U.S. Application Data

(63) Continuation-in-part of application No. 15/988,063, filed on May 24, 2018, now Pat. No. 10,548,425.

(60) Provisional application No. 62/510,535, filed on May 24, 2017.

(51) Int. Cl.
| | | |
|---|---|---|
| *F16M 13/02* | (2006.01) | |
| *A47H 1/18* | (2006.01) | |
| *A47B 96/02* | (2006.01) | |

(52) U.S. Cl.
CPC ......... *F16M 13/022* (2013.01); *A47B 96/024* (2013.01); *A47H 1/18* (2013.01); *A47B 2220/0002* (2013.01)

(58) Field of Classification Search
CPC ........ A47H 19/00; A47H 1/18; F16M 13/022; F16M 11/28; A47B 2220/0002; A47B 96/024; A47F 11/02; A47F 5/04; A47F 5/05; A47F 5/106; A47G 2200/106; A47G 25/1478; A47G 25/16; A47G 25/48; A47G 25/485; A47G 25/52; A47G 5/00; A47G 9/02; A47G 9/10; A47G 9/1009; A47G 9/1045

USPC ....... 248/205.1, 206.3, 447.1, 48.2; 160/330, 160/340, 348, 368.1
See application file for complete search history.

(56) References Cited

U.S. PATENT DOCUMENTS

| | | | | |
|---|---|---|---|---|
| 2,110,005 | A * | 3/1938 | Rees | F24C 15/08 248/188.2 |
| 2,430,959 | A * | 11/1947 | Soff | 160/38 |
| D171,595 | S * | 3/1954 | Harriton | D6/541 |
| 4,863,130 | A * | 9/1989 | Marks, Jr. | B60R 1/00 248/206.3 |
| 8,182,012 | B1 * | 5/2012 | Brister | B60P 3/40 296/26.11 |
| 9,302,717 | B1 * | 4/2016 | Rude | B62D 33/0273 |
| 10,548,425 | B1 * | 2/2020 | Drozd | A47H 19/00 |
| 2014/0319296 | A1 * | 10/2014 | Clouser | F16M 13/02 248/206.3 |

* cited by examiner

*Primary Examiner* — Muhammad Ijaz
(74) *Attorney, Agent, or Firm* — David P. Lhota, Esq.; Lhota & Associates, P.A.

(57) ABSTRACT

A portable shelf device for lifting and holding window dressings, such as draperies and curtains, off and above the floor and baseboards to facilitate more convenient cleaning or painting of the baseboards, lower walls or floors, or other items such as shower accessories, plants or automobile cleaning accessories, the portable shelf device including a face plate hinged to a base plate, first face plate flange, second face plate flange, first or left side panel hinged to the first face plate flange and having an inward projecting flange at a lower end, second or right side panel hinged to second face plate flange and having an inward projecting flange at a lower end and a plurality of suction cups wherein each suction cup is mounted to and projects outward from respective side panel flanges and wherein the first and second side panel flanges support the base plate when the base plate is pivoted away from the face plate.

18 Claims, 5 Drawing Sheets

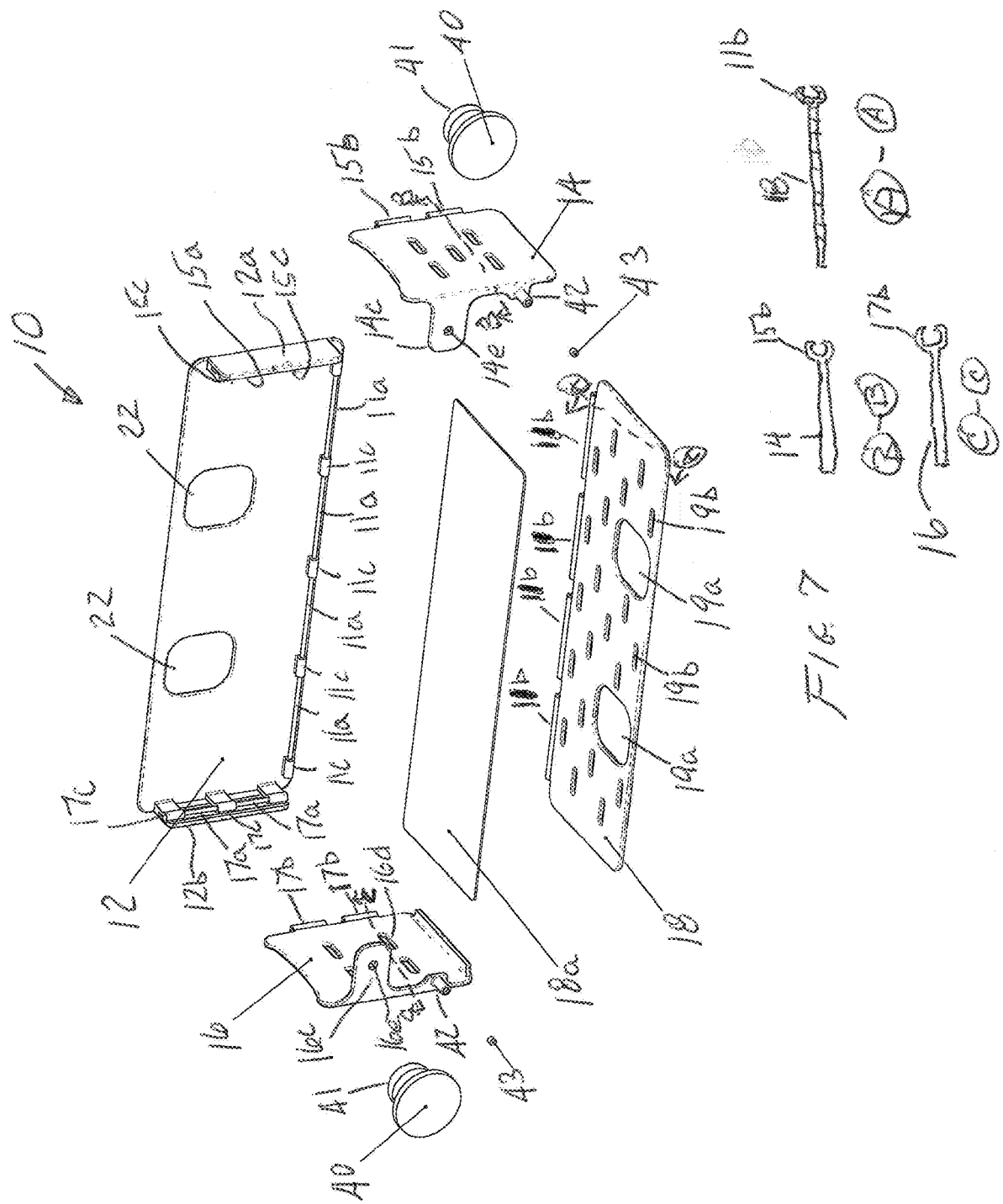

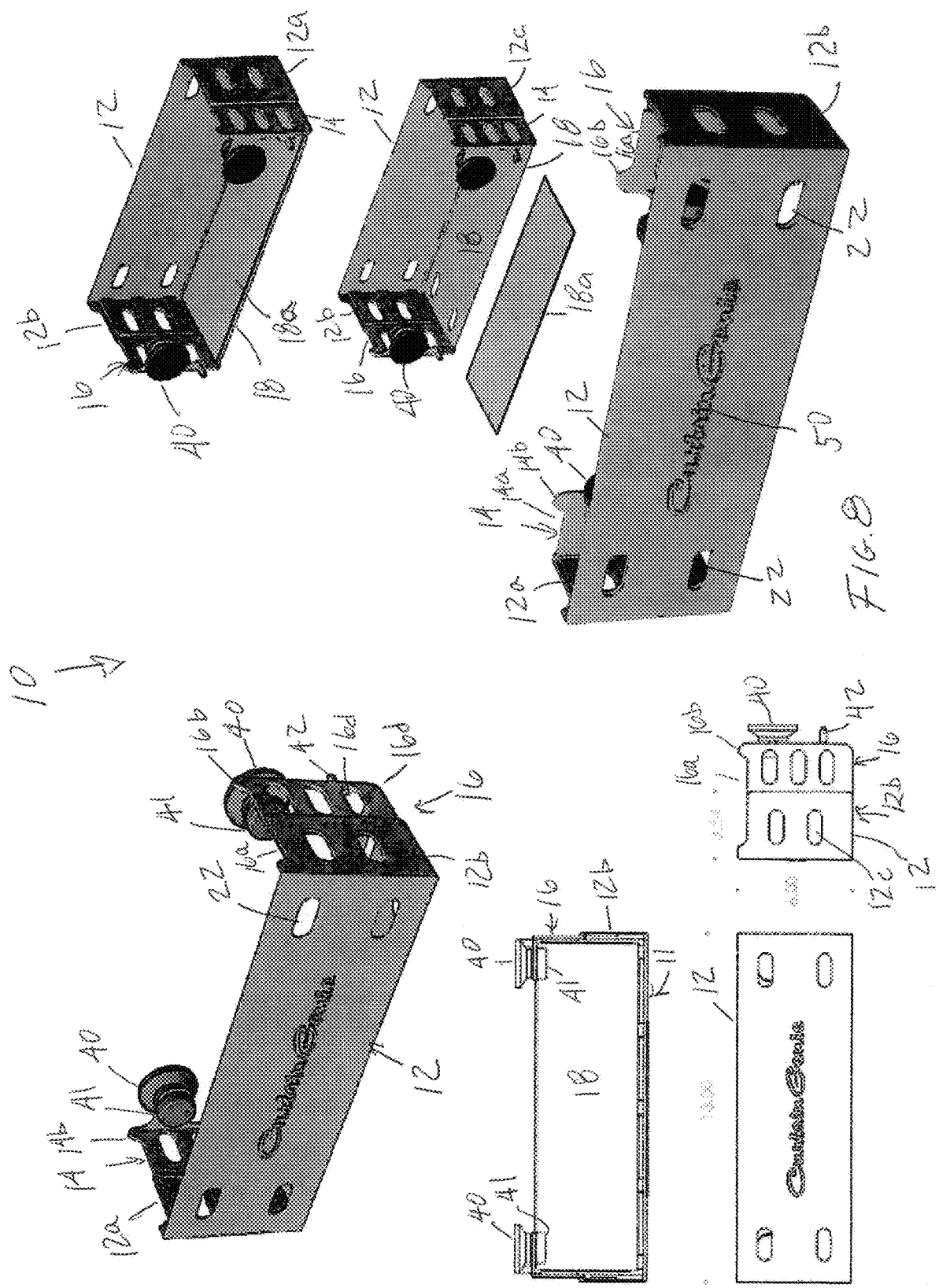

PORTABLE AND FOLDABLE SHELF AND WINDOW DRESSING SUPPORT DEVICE

CROSS-REFERENCE TO RELATED APPLICATION

This application is a continuation-in-part of application Ser. No. 15/988,063 filed May 24, 2018 which claims the benefit of provisional application Ser. No. 62/510,535 filed May 24, 2017.

STATEMENT REGARDING FEDERALLY SPONSORED RESEARCH OR DEVELOPMENT

N/A

FIELD OF THE INVENTION

The present invention relates to a portable shelf or window dressing elevation accessory, and in particular, to a portable and foldable shelf or window dressing support device that attaches to a window, wall or other flat surface to hold curtains, drapes or other window or wall dressings in an elevated position above and off the floor or wall to facilitate convenient cleaning or maintenance of the floor, baseboard or wall below or behind the curtain, to a wall or window to hold items such as plants, to a shower wall to hold shampoo or other cleaning items or to an automobile for holding car wash, wax and other items used for cleaning or detailing an automobile. The instant invention is also foldable for convenient packaging and storage.

BACKGROUND OF THE INVENTION

Curtains, drapes and other window dressings or coverings, especially those of the full-length variety, are well known to provide an obstacle to vacuuming or cleaning the floor and baseboards in homes and offices. They typically hang in front of a wall or baseboard and are difficult to work around or to hold back while cleaning the floor, baseboards or wall. In fact, the window dressings can be soiled when trying to clean or perform maintenance to the areas in their vicinity which would then require cleaning the window dressing. It is common to just hold or place the window dressing on one's arm or piece of furniture, but this impedes the ability to paint or clean and is also unreliable. Strings, straps, hooks or other types of hanger devices have also been used to hold curtains, drapes or other window coverings above or away from the floor, baseboard or wall. However, the cord must be tied or secured to a stationery object, such as a curtain rod, which can be difficult to implement and tedious, especially when someone is too short to reach the curtain rod or when dealing with multiple windows and window coverings throughout a house or office. Moreover, using cords, arms or furniture to hold window dressing can be unstable, unreliable and ultimately fail because of the weight or bulk of the curtains, drapes or coverings, which results in the curtain or drapery falling through the cord and getting soiled. This process is especially tedious, time consuming and frustrating when multiple sets of window coverings must be cleared away for routing maintenance or cleaning. There exists a need for a device that could not only reliably isolate, elevate and support window coverings away from the floor and, or wall while painting, cleaning or performing other maintenance on floors, baseboards or walls, but that could also be conveniently and easily moved from one location to another. In fact, such a device would be even more desirous if it could be quickly folded for packaging or storage. However, there are no devices known that adequately and effectively protect window coverings when performing these maintenance tasks and that may be moved easily and quickly.

It is also known that holding and displaying plants in front of a window, cleaning items, such as shampoo, conditioner and soap, in a shower or automobile washing or detailing items, such as car wash, wax and rags, is desirable. However, this is difficult or impossible to do because there are no portable shelf devices known for accomplishing this task. If a portable shelf existed for supporting such items anywhere inside or outside, it would be well received.

It is therefore desirable to have a device that could conveniently, reliably, quickly and efficiently support curtains, draperies and other window coverings above or away from a floor or wall when cleaning, painting or performing other maintenance on multiple windows or wall surfaces. It is also desirable to have a portable and foldable shelf that could be mounted on virtually any surface, including windows, walls, showers and cars, for holding plants, showering items, automobile cleaning or detailing items, or any other desired items. Such as device would be even more desirable if it could be folded for convenient storage or packaging. If there existed such a multipurpose a device that addressed these shortcomings in the background art, it would be well received. However, there are no devices known that conveniently, reliably and efficiently hold and protect curtains, draperies and other window dressings, plants, personal cleaning items or automobile cleaning items when performing routine cleaning or maintenance. As there are no known devices that satisfy or meet these objectives, there exists a need for such a device. It is, therefore, to the effective resolution of the aforementioned problems and shortcomings of the prior art that the present invention is directed. The instant invention addresses this unfulfilled need in the prior art by providing a foldable, moveable and transportable window dressing support or shelf device as contemplated by the instant invention disclosed herein.

SUMMARY OF THE INVENTION

In accordance with one aspect, the present invention provides a portable window dressing holding or shelf device for lifting and holding window dressings, such as draperies and curtains, off and above the floor and baseboards to facilitate more convenient cleaning or painting of the baseboards, lower walls or floors or other items such as plants, personal cleaning items or automobile cleaning or detailing items. The holding device includes a face plate, base plate, at least one hinge defined by the face plate and base plate pivotally connecting the face plate to the base plate, first or left side panel pivotally connected to a corresponding end of the face plate having a first inward projecting flange for supporting the base plate, second or right side panel pivotally connected to a corresponding end of the face plate, opposite the first end, having a second inward projecting flange for supporting the base plate together with the first flange, at least one left side hinge pivotally defined by said left side panel and said face plate for connecting the left side panel to one end of the face plate, at least one right side hinge defined by said right side panel and said face plate for pivotally connecting the right side panel to an opposite end of the face plate, a left side bottom flange projecting inward from a lower end of the left side panel, a right side bottom flange projecting inward from a lower end of the right side panel wherein the bottom flanges support the base plate when the holding device is in use, and a plurality of suction cups wherein each suction cup is mounted to and projects outward from respective side panel flanges.

In another aspect, the present invention provides a window dressing holding or portable shelf device that includes a face plate hinged to a base plate by at least one hinge defined by the face plate and base plate for pivotally connecting the face plate to the base plate, first side panel having a lower inward projecting flange, second side panel having a lower inward projecting flange wherein the first and second flanges support the base plate, a first side flange defined by and extending from a first end of the face plate, a second side flange defined by and extending from a second end of the face plate, at least one first hinge defined by the first side panel and the first side flange of the face plate for pivotally connecting the first side panel to one end of the face plate, at least one second side hinge defined by the second side panel and the second side flange f the face plate for pivotally connecting the second side panel to an opposite end of the face plate, a first upper flange projecting inward from the first side panel for supporting a first suction cup, a second upper flange projecting inward from the second side panel for supporting a second suction cup, and a plurality of apertures formed in the face plate and base plate to create airflow and reduce static to prevent the window dressing from clinging to the plates and to reduce weight. The face plate may have a first aperture for receiving a first suction cup from the first upper flange and a second aperture for receiving a second suction cup from the second upper flange when the side panels are folded to the rear surface of the face plate.

In an additional aspect, the present invention provides a window dressing holding or portable shelf device that includes a face plate hinged to a base plate, at least one hinge defined by the face plate and base plate for pivotally connecting the face plate to the base plate, left side panel having a lower inward projecting flange projecting inward from a lower end of the left side panel, right side panel having a lower inward projecting flange projecting inward from a lower end of the right side panel wherein the lower left and right flanges support the base plate, a first side flange defined by and extending from a first end of the face plate, a second side flange defined by and extending from a second end of the face plate, at least one left side hinge defined by the first side flange of the face plate and the left side panel for pivotally connecting the left side panel to the left end of the face plate, at least one right side hinge defined by the second side flange of the face plate and the right side panel for pivotally connecting the right side panel to a right end of the face plate, a left side flange extending inward from the first side panel and having a first aperture for supporting a first suction cup, a right side flange extending inward from the right side panel and having an aperture for supporting a second suction cup, first tab projecting from the first side flange below the first aperture and a second tab projecting from the second side flange below the second aperture for engaging the support surface to stabilize the device below the suction cups and a plurality of apertures formed in the face plate and base plate to create airflow and reduce static to prevent the window dressing from clinging to the plates and to reduce weight. The first side hinge and second side hinge being positioned for engaging the first suction cup from the first upper flange and the second suction cup from the second upper flange with the rear surface of the face plate when the side panels are folded to the rear surface of the face plate.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 7 a rear exploded view of the portable shelf device shown in FIG. 1 in accordance with the principles of a preferred embodiment of the present invention; and FIG. 8 is are front and rear exploded views of the portable shelf device in accordance with the principles of an alternative embodiment of the present invention.

DETAILED DESCRIPTION OF THE INVENTION

With reference to the drawings in which like reference designators refer to like elements, FIGS. 1 to 8 depict the preferred and alternative embodiments of the instant invention which is generally referenced as a window dressing support device, portable shelf, support device and, or by numeric character 10. There is shown in FIGS. 1-8 a window dressing support device 10 for holding or supporting window dressings above a floor or away from a wall to facilitate convenient cleaning, painting or maintenance of the floor or wall, The instant invention 10 may also be used to hold cleaning and maintenance items when working, such as shower products, car cleaning or detailing items, plants or other items. The support device 10 may be secured to a window or wall, and provides a trough for placing the window dressing when lifted off or above the floor or other items to any surface, including windows, walls, cars, etc. The device 10 is foldable into a rectangular cube for convenient packaging when shipping or sold, storage and relocating. The device 10 is easily moveable to other positions or locations for use throughout a house, office or outside.

Figure 1:
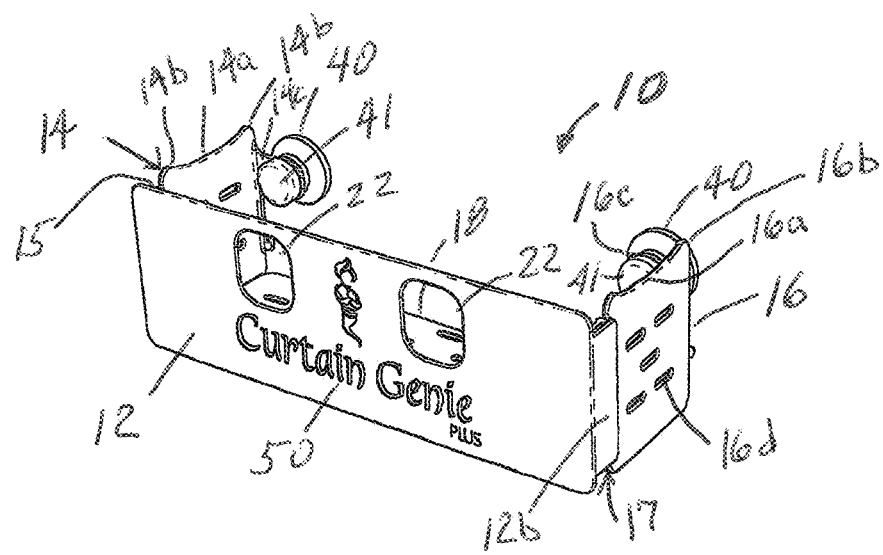
FIG. 1 is front perspective view of the portable shelf device in accordance with the principles of a preferred embodiment of the present invention.
Figure 2:
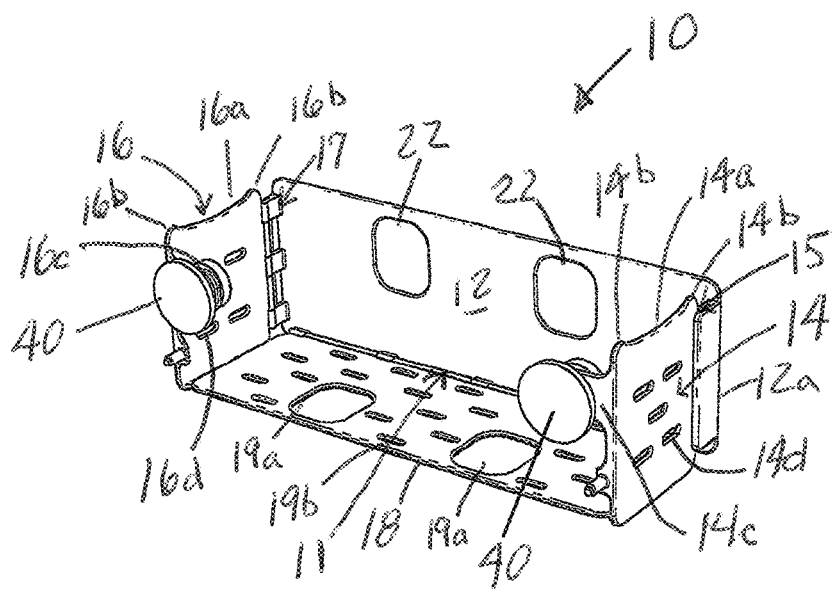
FIG. 2 is a rear perspective view of the portable shelf device shown in FIG. 1 in accordance with the principles of a preferred embodiment of the present invention.
Figure 3:
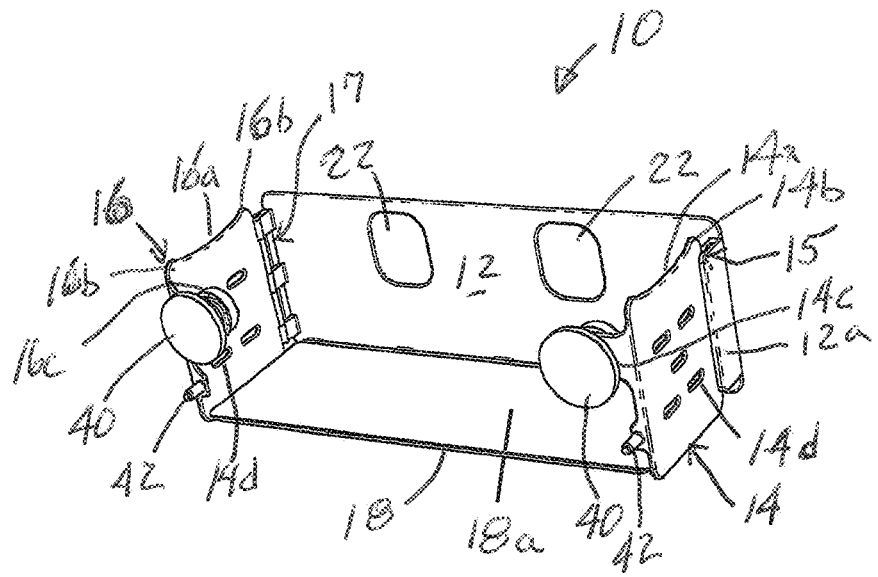
FIG. 3 is a rear perspective view of the portable shelf device shown in FIG. 1 with an insert panel in accordance with the principles of a preferred embodiment of the present invention.
Figure 4:
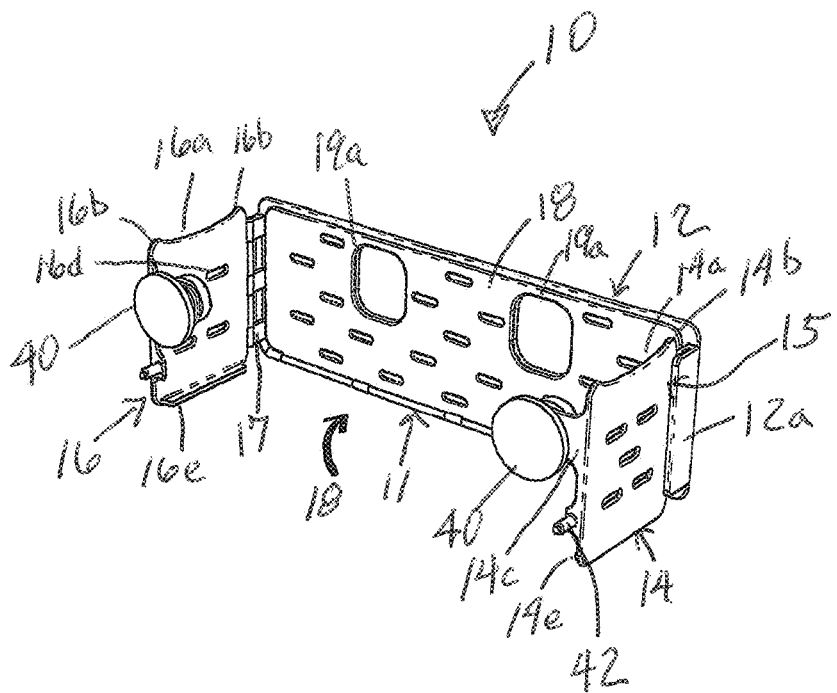
FIG. 4 is a rear perspective view of the portable shelf device shown in FIG. 1 showing the base plate folded upward against the back of the face plate in accordance with the principles of a preferred embodiment of the present invention.
Figure 5:
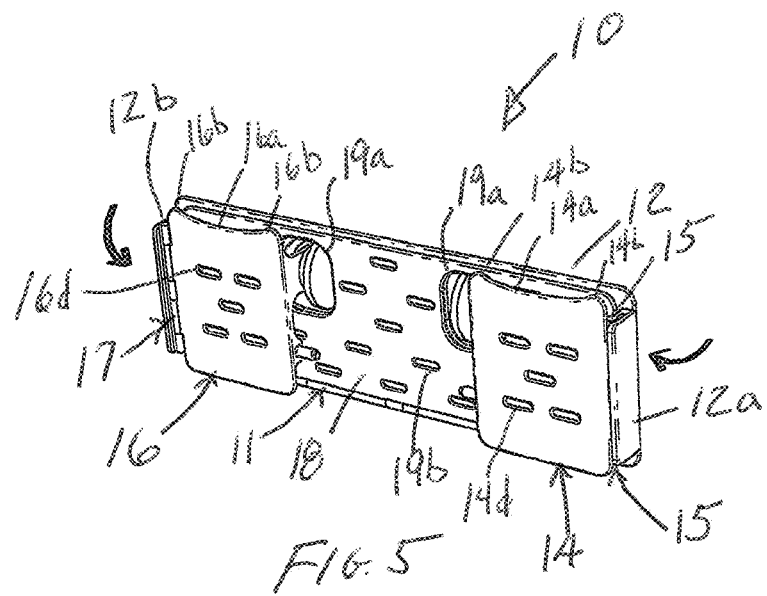
FIG. 5 is a rear perspective view of the portable shelf device shown in FIG. 1 showing the base plate and side panels folded inwards as is typical for packaging or storage in accordance with the principles of a preferred embodiment of the present invention.
Figure 6:
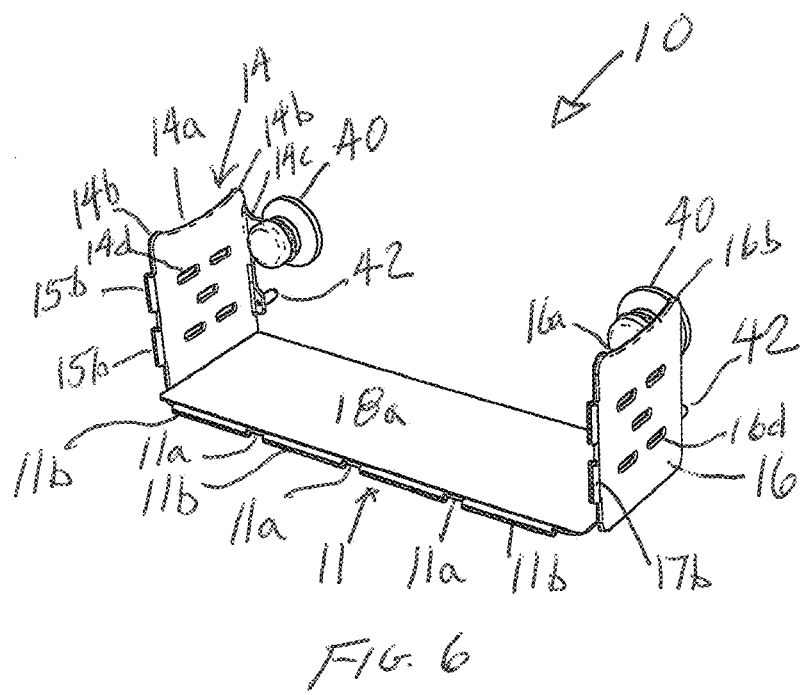
FIG. 6 is a rear perspective view of the portable shelf device shown in FIG. 1 with an insert panel over the base plate and the face plate removed for an open shelf in accordance with the principles of a preferred embodiment of the present invention.

With reference to FIGS. 1-8, the preferred embodiment of the window dressing support device 10 provides a portable shelf device that includes a face plate 12 hinged to a base plate 18, at least one hinge 11 defined by the face plate 12 and base plate 18 to pivotally connect the face plate 12 to the base plate 18, left side panel 14 having an inward projecting upper flange 14c, right side panel 16 having an inward projecting upper flange 16c, a left side face plate flange 12a defined by and projecting from the rear surface of the face plate 12, a right side face plate flange 12b defined by and projecting from the rear surface of the face plate 12, at least one left side hinge 15 defined by the left side panel 14 and left side face plate flange 12a pivotally connecting the left side panel 14a to a left end of the face plate 12, at least one right side hinge 17 defined by the right side panel 16 and right side face plate flange 12b for pivotally connecting the right side panel 16 to a right end of the face plate 12, a left side upper flange 14c projecting inward from the free end of the left side panel 14 for supporting a first suction cup 40 and a right side upper flange 16c projecting inward from the free end of the right side panel 16 for supporting a second suction cup 40. The suction cups 40 may have a threaded knob 41 or lever for applying, increasing, decreasing or otherwise adjusting the suction force. The left side panel 14 defines an upper arcuate edge 14a to define upward projecting lobes 14b, a plurality of apertures 14d and lower base plate support flange 14e projecting inward from the lower end or edge of the left side panel 14. The right side panel 16 defines an upper arcuate edge 16a to define upward projecting lobes 16b, a plurality of apertures 16d and lower base plate support flange 16e projecting inward from the lower end or edge of the right side panel 16. The left side panel 14 and right side panel 16 fold outward to facilitate pivoting the base plate 18 outward onto the left side panel flange 4e and right side panel flange 16e and into place at a ninety degree angle with the face plate 12 to support the base plate 18 for use. The face plate-base plate hinge 11 is defined by at least one and preferably a plurality of axles 11a separated by support tabs 11c which are defined on the lower edge of the face plate 12 and at least one and preferably a plurality of C-clamps 11b that align with and snap to the axles 11a. Referring to FIGS. 1-7, the left side panel hinge 15 is defined by at least one and preferably a plurality of axles 15a separated by support tabs 15c which are defined on the inner edge of the left side face plate flange 12a and at least one and preferably a plurality of C-clamps 15b that align with and snap to the left side axles 15a. Still referring to FIGS. 1-7, the right side panel hinge 17 is defined by at least one and preferably a plurality of axles 17a separated by support tabs 17c which are defined on the inner edge of the right side face plate flange 12b and at least one and preferably a plurality of C-clamps 17b that align with and snap to the right side axles 17a. When the left side panel 14 and right side panel 16 are folded inward, the suction cups 40 partially pass through the face plate apertures 22 and base plate apertures 19a for packaging or storage, as shown in FIG. 5. The face plate 12 may be removed for an open shelf as shown in FIG. 6. The base plate 18 includes a plurality of apertures 18b while the side panels 14, 16 include apertures 14d and 16d to provide air flow and prevent static cling as well as reduce weight. The invention 10 may include a flat insert 18a to cover or conceal the apertures 19b

Still referring to FIGS. 1-7, the side panels 14 and 16 are narrow substrates that form a separation as supported by the face plate 12. This provides the effect of a complete side panel without using all the material necessary for a full panel to reduce weight and manufacturing cost. The support device 10 may be stabilized when mounted to a support surface by posts 42 which project from the left side panel 14 below the left side upper flange 14c and right side upper flange 16c, respectfully. The posts 42 are capped with a rubber tip 43 to prevent damage to the support surface.

Now referring to FIG. 8, the support device 10 has a left side face plate flange 12a and right side face plate flange 12b that extend a distance that moves the side panels 14,16, respectfully further from the face plate 12 so the suction cups 40 engage but do not pass through the face plate and base plate 18 when folded inward. In this embodiment, the face plate apertures 22 and base plate apertures 19a are not required.

Now referring to FIGS. 1-5, the face plate 12 and base plate 18 include a plurality of apertures 22,19a,19b, respectively, for an aerodynamic advantage that creates airflow and reduces static to prevent the window dressing from clinging to the plates 12,18 while reducing weight. As the window dressing tends to rest in on the bottom plate 18, the bottom plate 18 preferably has more apertures than the face plate 12. The side panels 14 and 16 may also have apertures 14d, 16d. The device 10, and more particularly the face panel 12, base panel 18, and side panels 14 and 16 are preferably manufactured from polypropylene plastic or comparable substitute for weight reduction and mass production. The device 10 may be manufactured from another material without departing from the scope and spirit of the instant invention 10.

Now referring to FIGS. 5 and 8, the support device 10 is able to fold into a compact form by virtue of the hinges 11, 15 and 17 and the shape of the side panels 14, 16, including the face plate side panel flanges 12a and 12b and the dimensions of the face plate 12, base plate 18, side panels 14, 16 and face plate side flanges 12a, 12b relative to each other. The base plate 18 is pivotally connected to the face plate 12 by at least one and preferably a plurality of hinges 11 that enable the base plate 18 to swing backward over the outside front surface of the face plate 12. Meanwhile, the side panels 14, 16 swing inward over the rear surface of the face panel 12, as shown in FIGS. 5 and 8.

The support device 10 is preferably manufactured from a thermoplastic, plastic or other material amenable to injection molding and mass production. The support device 10 may alternatively be made from fiberglass, aluminum, stainless steel or other rustproof material.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations am possible in light of the above teachings without departing from the scope and spirit of the invention, which is limited only by the following claims.

What is claimed is:

1. A window dressing support device for supporting curtains, drapes or blinds, said support device comprising:
   a face plate having a front surface and a rear surface;
   a base plate pivotally connected to said face plate such that said base plate pivots with respect to said rear surface;
   at least one hinge defined by said face plate and said base plate for facilitating the pivoting of said base plate with respect to said face plate;
   a first side panel pivotally connected to a first end of said face plate;
   a second side panel pivotally connected to a second end of said face plate;
   at least one first support means extendable from said first side panel for supporting said base plate when it is pivoted away from said rear surface of said face plate;
  at least one second support means extendable from said second side panel for supporting said base plate when it is pivoted away from said rear surface of said face plate; and
  mounting means, supported on said first and second side panels, for mounting said support device to a support surface.

2. The support device of claim 1, wherein said support device further comprises:
  said at least one first support means extending from said first side panel includes a first bottom flange extending inward from a lower end of said first side panel; and
  said at least one second support means extending from said second side panel includes a second bottom flange extending inward from a lower end of said second side panel for supporting said base plate when pivoted away from said face plate.

3. The support device of claim 1, wherein said support device further comprises:
  a support post extending from said first side panel; and
  a support post extending from said second side panel.

4. The support device of claim 1, further comprising:
  a face plate first side flange extending backward from said face plate, said first side panel pivotally connected to said face plate first side flange; and
  a face plate second side flange extending backward from said face plate, said second side panel pivotally connected to said face plate second side flange.

5. The support device of claim 4, wherein:
  said first side panel comprises a first upper flange projecting inward;
  said second side panel comprises a second upper flange projecting inward; and
  said mounting means comprises a first suction cup mountable to said first upper flange and a second suction cup mountable to said second upper flange.

6. The support device of claim 1, wherein:
  said mounting means comprises a first suction cup mountable to said first side panel and a second suction cup mountable to said second side panel.

7. The support device of claim 1, further comprising:
  a first side hinge defined by said first side panel and said face plate; and
  a second side hinge defined by said second side panel and said second end of said face plate.

8. The support device of claim 7, wherein:
  said first side hinge comprises at least one first axle defined by said face plate first side flange and a first C-clamp defined by said first side panel for snapping to said at east one first axle; and
  said second side hinge comprises at least one second axle defined by said face plate second side flange and a second C-clamp defined by said second side panel for snapping to said at least one second axle.

9. The support device of claim 7, wherein said at least one hinge defined by said face plate and said base plate comprises:
  at least one face plate axle defined by said face plate and at least one base plate C-clamp defined by said base plate for snapping to said at least on face plate axle.

10. The support device of claim 6, further comprising:
  a first aperture defined in said face plate for receiving said first suction cup when said first side panel is pivoted toward said rear surface of said face plate; and
  a second aperture defined in said face plate for receiving said second suction cup when said second side panel is pivoted toward said rear surface of said face plate.

11. The support device of claim 10, wherein further comprising:
  a first aperture defined in said base plate for receiving said first suction cup when said first side panel is pivoted toward said rear surface of said face plate and said base plate; and
  a second aperture defined in said base plate for receiving said second suction cup when said second side panel is pivoted toward said rear surface of said face plate and said base plate.

12. The support device of claim 1, wherein said at least one hinge defined by said face plate and said base plate comprises:
  at least one face plate axle defined by said face plate and at least one base plate C-clamp defined by said base plate for snapping to said face plate axle.

13. The support device of claim 1, wherein said support device further comprises:
  a first bottom flange extending inward from a lower end of said first side panel.

14. The support device of claim 13, wherein said support device further comprises:
  a second bottom flange extending inward from a lower end of said second side panel.

15. The support device of claim 1, further comprising:
  a plurality of apertures defined in said base plate.

16. The support device of claim 1, further comprising:
  a plurality of apertures defined in said face plate.

17. The support device of claim 1, further comprising:
  a plurality of apertures defined in said first side panel.

18. The support device of claim 17, further comprising:
  a plurality of apertures defined in said second side panel.

* * * * *